UNITED STATES PATENT OFFICE.

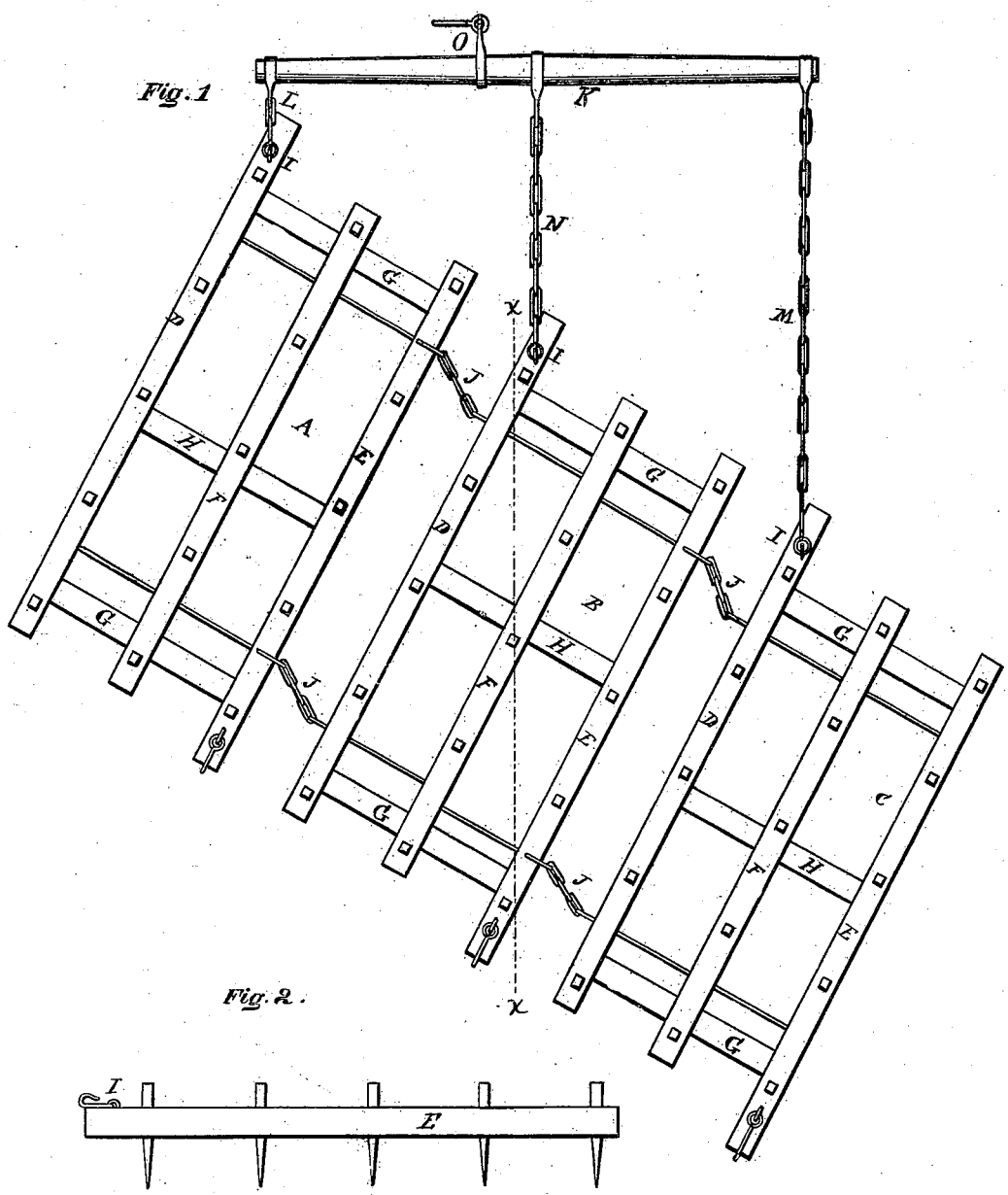

JAMES GARRETT, OF LE ROY, ASSIGNOR OF ONE-HALF HIS RIGHT TO ROBT. C. SMITH, OF THOMPSON, OHIO.

IMPROVEMENT IN HARROWS.

Specification forming part of Letters Patent No. 188,510, dated March 20, 1877; application filed November 25, 1876.

*To all whom it may concern:*

Be it known that I, JAMES GARRETT, of Le Roy, county of Lake, and State of Ohio, have invented certain new and useful Improvements in Harrows, which improvements are fully set forth in the following specification.

The nature of this invention relates to a land-harrow, the object of which is the production of a harrow that readily adjusts itself to the uneven surface of the ground, and may be easily and quickly changed from a coarse grade of harrow to a finer grade of set to the teeth, as the nature of the work may require, by adjusting the attachments of the equalizing-bar or stretcher whereby the harrow is drawn. A more full description of said invention, and operation of the same, is hereinafter set forth, reference being had to the accompanying drawings, in which—

Figure 1 is a top view of the harrow and its attachments; Fig. 2, a side view of one section of the harrow.

Like letters refer to like parts in the said drawings.

The harrow referred to consists of three sections, A B C, each of which is a rectangular frame, comprised of the side pieces D and E and a middle piece, F, secured to each other by the transverse pieces or ties G, one at each end, and a center piece, H. One end of each of the side pieces extends a little beyond the end of the frame for the point of draft for each section or frame, each one being drawn by the corner I, as will be seen in the drawings. The three sections are loosely attached to each other by chain-links J. Each section is drawn by one corner. To attain this end is used an equalizing-bar or stretcher, K, at the ends of which the sections A and C are, respectively, attached by the chains or links L and M. The middle section B is connected to the center of the equalizing-bar by links N.

It will be observed, on examination of the drawings, that the draft-chains L, M, and N are of unequal lengths, thereby placing the equalizing-bar or stretcher at an angle to the ends of the sections, instead of parallel therewith; hence, the sections will be drawn at an angle or cornerwise to the line of draft, more or less, according to the length of the draft-chains M N, as indicated by the line X X.

In view of the angular relation that the stretcher holds in respect to the front end of the sections, the several sections are drawn diagonally, so that the teeth of the harrow will not track, but run in lines parallel to each other, which may be of greater or less distance apart by adjusting the draft-chains. In order to harrow the ground finer, the chains or links M and N are to be lengthened out, the effect of which will be to draw the whole number of sections in a more diagonal line, which, as a consequence, will bring the teeth in each section in such relation as to make the teeth markings or lines closer together, or, on shortening up the two chains M N, the sections will be drawn more or less abreast, or less angular, thereby making the teeth-markings coarser or farther apart, and the line of draft equally through the sections; hence, the draft of the harrow is evenly balanced on each side of the point to which the team is connected. Thus one section and a half are on one side and one section and a half on the other side of the draft-line, as indicated by the line X X, and by which it will be seen that there is the same area of the sections on one side as there is upon the other.

The team is hitched to the equalizing-bar at the clevis or point O, which is adjustable and eccentric to the point at which the draft-chain N is attached. The purpose of applying the power at this point of the said bar is to bring the draft-line in such relation to the teeth that they will not follow each other in the same track—that is to say, the rear teeth in each section shall not follow in the track of the preceding ones; and, furthermore, in view of this fact the force of the draft from the section A should be somewhat more than that applied to the section B, in order to cause it to move in advance of the said section B, so that the distance between them may be preserved; otherwise the section B would move around on section A, and thereby throw the relation of the teeth in one section out of its proper relation to the teeth of the others. Each section is connected to the other by means of links or chains J, in such way as to allow of their being folded up or disconnected, thereby rendering them easy and convenient for handling and transportation. The sections are separately connected by the links to the stretcher; hence each harrow is drawn separately—that is to say, the harrows do not draw each other, but each one is drawn by the link connecting it to the bar K; hence, in passing over any obstruction or depression of the ground, each section will adjust itself to the formation of the ground, without disturbing or affecting the draft of the others, and causing the draft to be light and easy for the team, as this retarding of one section when in use does not disturb the draft and action of the others materially; and, further, as the entire harrow is composed of three sections, they are necessarily light, readily adjusting themselves to the conditions of the ground, and freeing the teeth from sod, grass, vines, and other obstructions which gather on the teeth of harrows. This light and adjustable construction admits of their readily freeing themselves from such obstructions.

It will be seen that the manner of connecting the sections A B C gives them an independent motion, so that when at work the teeth will not clog or follow in the line of each other, but will harrow the ground over effectively by once going over it.

What I claim as my improvement, and desire to secure by Letters Patent, is—

In harrows, the adjustable links L M, of various lengths, in combination with the sections A, B, and C, stretcher or bar K, with the adjustable clevis or draft-point eccentric thereto, and link-connections J J, arranged substantially as and for the purpose set forth.

JAMES GARRETT.

Witnesses:
W. H. BURRIDGE,
J. H. BURRIDGE.